United States Patent
Jung (10) Patent No.: US 8,824,112 B2
(45) Date of Patent: Sep. 2, 2014

(54) DIGITAL PROTECTION RELAY AND OPERATION METHOD THEREOF

(75) Inventor: Jong Jin Jung, Cheongju (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 297 days.

(21) Appl. No.: 13/425,330

(22) Filed: Mar. 20, 2012

(65) Prior Publication Data
US 2012/0327541 A1    Dec. 27, 2012

(30) Foreign Application Priority Data

Jun. 24, 2011    (KR) .......................... 10-2011-0061950

(51) Int. Cl.
*H02H 3/00*    (2006.01)
*H02H 7/00*    (2006.01)
*H02H 3/46*    (2006.01)

(52) U.S. Cl.
CPC ...................................... *H02H 3/46* (2013.01)
USPC ........................................................... 361/62

(58) Field of Classification Search
CPC .................................. H02H 3/44; H02H 3/46
USPC .......................... 361/62, 63, 65, 88, 93.1, 160
See application file for complete search history.

(56) References Cited

U.S. PATENT DOCUMENTS

| | | | | |
|---|---|---|---|---|
| 4,547,726 A | * | 10/1985 | Premerlani | 324/76.21 |
| 5,721,689 A | * | 2/1998 | Hart et al. | 702/75 |
| 5,832,413 A | * | 11/1998 | Benco et al. | 702/77 |
| 5,832,414 A | * | 11/1998 | Hart et al. | 702/77 |
| 5,995,400 A | * | 11/1999 | Park et al. | 363/146 |
| 6,233,132 B1 | * | 5/2001 | Jenski | 361/160 |
| 6,366,864 B1 | * | 4/2002 | Kulidjian et al. | 702/60 |
| 6,519,537 B1 | * | 2/2003 | Yang | 702/58 |
| 6,717,394 B2 | * | 4/2004 | Elms | 324/76.39 |
| 7,328,114 B2 | * | 2/2008 | Premerlani et al. | 702/75 |
| 7,920,976 B2 | * | 4/2011 | Banhegyesi | 702/60 |
| 8,080,902 B2 | * | 12/2011 | Bright | 307/85 |
| 2009/0319093 A1 | * | 12/2009 | Joos et al. | 700/297 |
| 2011/0068631 A1 | * | 3/2011 | Roscoe | 307/69 |

FOREIGN PATENT DOCUMENTS

| | | |
|---|---|---|
| EP | 1193823 | 4/2002 |
| JP | 2008-022612 | 1/2008 |

OTHER PUBLICATIONS

The State Intellectual Property Office of the People's Republic of China Application Serial No. 201210209912.0, Office Action dated May 19, 2014, 8 pages.

* cited by examiner

*Primary Examiner* — Rexford Barnie
*Assistant Examiner* — Christopher Clark
(74) *Attorney, Agent, or Firm* — Lee, Hong, Degerman, Kang & Waimey (57) ABSTRACT

The present disclosure relates to a digital protection relay and an operation method of the digital protection relay for enhancing the operation of a frequency change rate relay element (81R) thereof, and the digital protection relay and an operation method thereof may calculate a plurality of different frequency change rates from the measured frequency and use a value of the frequency change rate selected based on a predetermined criteria in the control of a relay operation, thereby providing an effect of enhancing reliability for the operation of the frequency change rate relay element.

16 Claims, 6 Drawing Sheets

DIGITAL PROTECTION RELAY AND OPERATION METHOD THEREOF

CROSS-REFERENCE TO RELATED APPLICATION

Pursuant to 35 U.S.C. §119(a), this application claims the benefit of earlier filing date and right of priority to KR Provisional Application No. 10-2011-0061950, filed on Jun. 24, 2011, the contents of which is incorporated by reference herein in its entirety.

BACKGROUND OF THE INVENTION

1. Field of the Invention

The present disclosure relates to a protection relay and an operation method of the protection relay, and more particularly, to a protection relay and an operation method of the protection relay for enhancing the relay operation of a frequency change rate relay element.

2. Description of the Conventional Art

In general, various protective relays may be used to protect feeder lines, motors, transformers, and the like in a power system. Such a protective relay can be classified into a mechanical type and a digital type. The digital protection relay may include the function of a relay, communication, a digital input/output contact point, and the like in a complex manner. When a failure occurs at any position of the power system, such a digital protection relay performs a role of quickly separating a section where a failure occurs. In particular, if a side of the power system is separated from the system while the distributed power generation is operated in interconnection with the power system, a frequency change rate relay element (81R) of the digital protection relay should be designed to be separated from the distributed power generation side or system. If not so, then there is worry of making asynchronous power due to reclosing, and moreover, it may cause a safety accident. In other words, if the value is equal to or greater than a prestored set value while monitoring a frequency change rate of the frequency, then the frequency change rate relay element may separate the distributed power generation therefrom in a quick and accurate manner to rapidly cope with a failure or disturbance of the power system.

A zero-crossing scheme may be typically used for a method of measuring the frequency of an input signal. The zero-crossing scheme measures a frequency by detecting a time point at which the zero point is crossed from a waveform of the input voltage or current signal and calculating an interval between the detected zero-crossing time points. However, frequency measurement using such a zero-crossing scheme may have a structure that is fragile to a noise included in the input voltage signal. In particular, if an external noise is induced to allow the input signal to be deviated from the zero-crossing point, then a large error occurs between the measured frequency and the actual frequency, thereby causing a malfunction of the frequency change rate relay element (81R).

SUMMARY OF THE INVENTION

The present disclosure is contrived to solve the foregoing problems, and an objective of the present disclosure is to provide a digital protection relay and an operation method of the digital protection relay in which one or more frequency change rates acquired from the measured frequency are additionally calculated, and then one of them is selected based on a predetermined criteria to be used as data for the control of a relay operation, thereby preventing a malfunction of the frequency change rate relay element and enhancing the reliability of the operation.

In order to accomplish the forgoing objective of the present disclosure, there is provided a digital protection relay, and the digital protection relay according to the present disclosure may include a frequency measurement unit configured to measure a frequency for an input signal using a zero-crossing scheme, a frequency change rate calculation unit configured to calculate a frequency change rate of the frequency for each predetermined period of the measured frequency to acquire first data, and accumulate and average the frequency for each predetermined period by a plurality of times and then calculate a frequency change rate of the frequency to acquire one or more second data, a deviation calculation unit configured to calculate a deviation of consecutive frequency change rates for a predetermined interval of time, and an operation controller configured to select a minimum value of the first data and one or more second data if the deviation is equal to or greater than a reference value, and select the first data if the deviation is less than the reference value to control the operation of the relay.

In an embodiment according to the present disclosure to accomplish the foregoing objective, the digital protection relay may be characterized in that the frequency change rate calculation unit differentiates a frequency measured by a half-period discrete Fourier transform with respect to time to acquire the first data. Furthermore, the digital protection relay may be characterized in that the frequency change rate calculation unit accumulates and averages a frequency measured by a half-period discrete Fourier transform by a plurality of times, and differentiates the average value with respect to time to acquire the one or more second data.

In an embodiment according to the present disclosure to accomplish the foregoing objective, the digital protection relay may be characterized in that the deviation calculation unit calculates a deviation using the maximum and minimum values in a current frequency change rate and a plurality of previously consecutive frequency change rates.

In order to accomplish the forgoing objective of the present disclosure, there is provided an operation method of the digital protection relay, and the method may include measuring a frequency for an input signal using a zero-crossing scheme, calculating a frequency change rate of the frequency for each predetermined period of the measured frequency to acquire first data, accumulating and averaging the frequency for each predetermined period by a plurality of times and then calculating a frequency change rate of the frequency to acquire one or more second data, calculating a deviation of consecutive frequency change rates for a predetermined interval of time, selecting a minimum value of the first data and one or more second data if the deviation is equal to or greater than a reference value, and selecting the first data if the deviation is less than the reference value, and controlling the operation of the relay using the selected data.

In an embodiment according to the present disclosure to accomplish the foregoing objective, the method may be characterized in that said acquiring first data differentiates a frequency measured by a half-period discrete Fourier transform with respect to time to acquire the first data. Furthermore, the method may be characterized in that said acquiring one or more second data accumulates and averages a frequency measured by a half-period discrete Fourier transform by a plurality of times, and differentiates the average value with respect to time to acquire the one or more second data.

In an embodiment according to the present disclosure to accomplish the foregoing objective, the method may be characterized in that said calculating a deviation calculates the deviation of a maximum and minimum value in a current frequency change rate and a plurality of previously consecutive frequency change rates.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a digital protection relay and an operation method of the digital protection relay according to the present disclosure will be described in detail with reference to the accompanying drawings.

Figure 1:
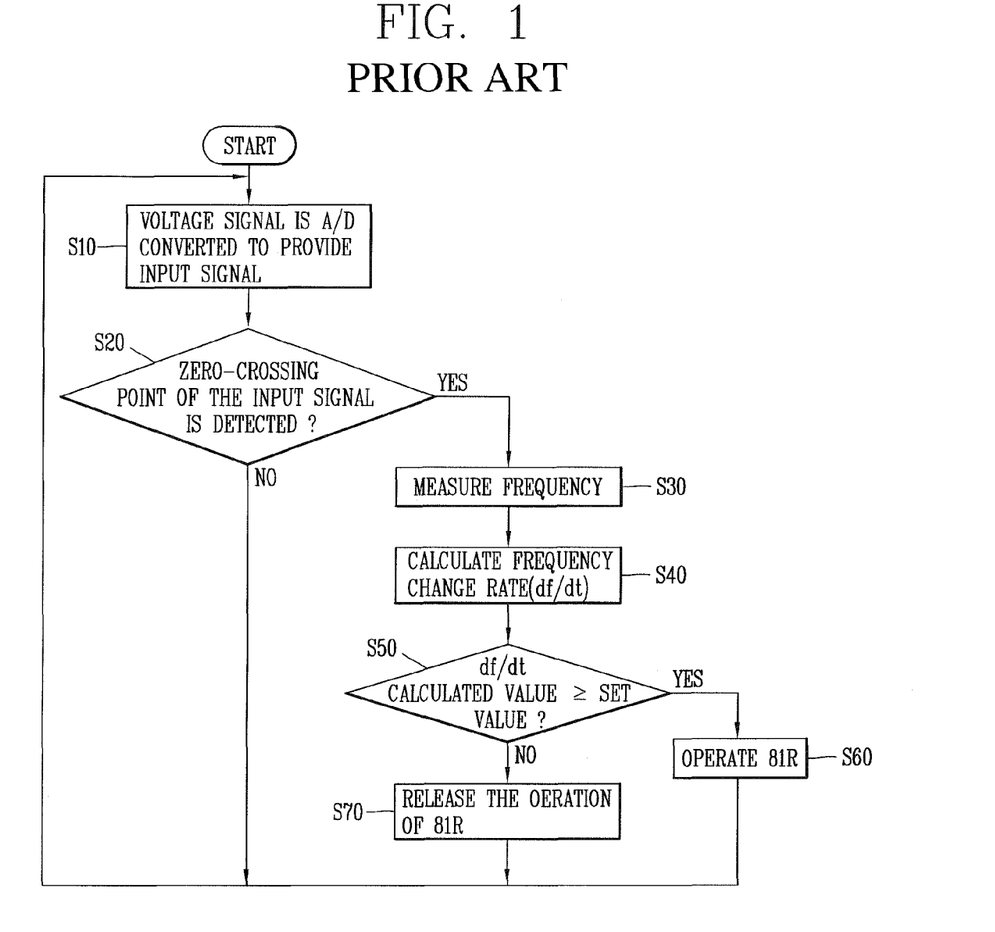
FIG. 1 is an operational flow chart illustrating a frequency change rate relay element of a digital protection relay according to the related art.
Figure 2:
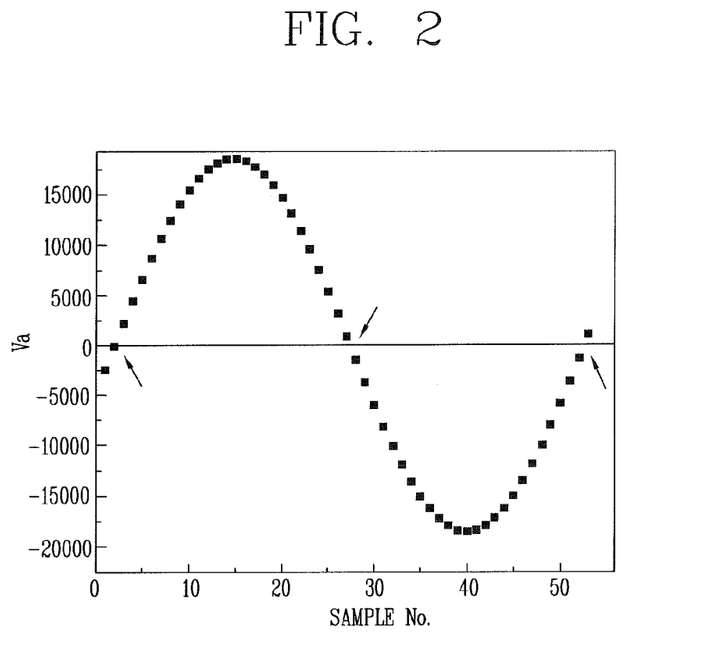
FIG. 2 is a view illustrating sample data of an input voltage signal.

FIG. 1 is an operational flow chart illustrating a frequency change rate relay element of a digital protection relay according to the related art. First, a voltage signal input to the system power is A/D-converted and provided as an input signal (S10). Then, a time point at which the zero point is crossed is detected from a waveform of the provided input signal (S20). The process of detecting a time point at which the zero point is crossed on the basis of measuring a frequency in such a manner is referred to as a zero-crossing scheme. Referring to FIG. 2, the sample data of a voltage signal input to the system power is illustrated, and a time point at which the zero point is crossed in the illustrated signal waveform is shown as an arrow. If there is no crossing point in step S20, the process returns to step S10. If a time point at which the zero point is crossed is detected, then the process advances to step S30 to measure a frequency from a waveform of the provided input signal. Then, the measured frequency is differentiated with respect to time to calculate the frequency change rate (S40). In other words, the frequency change rate should be calculated with a very short time interval by taking a swift operation of the frequency change rate relay element into consideration, and for example, the frequency change rate of a frequency may be calculated for a half-period by the following equation.

$$\frac{df}{dt} = \lim_{\Delta t \to 0} \frac{\Delta f}{\Delta t}.$$

Here, f denotes a frequency, and t denotes a time. The calculated frequency change rate value is compared with a set value stored in the protection relay (S50). As a result of the comparison, if the calculated frequency change rate value is equal to or greater than the stored set value, then an error occurs in the power system, and thus the frequency change rate relay element (81R) of the protection relay performs a correct operation (S60). If the calculated frequency change rate value is less than the stored set value, then the process returns to step S10 to repeat the foregoing steps.

Figure 3:
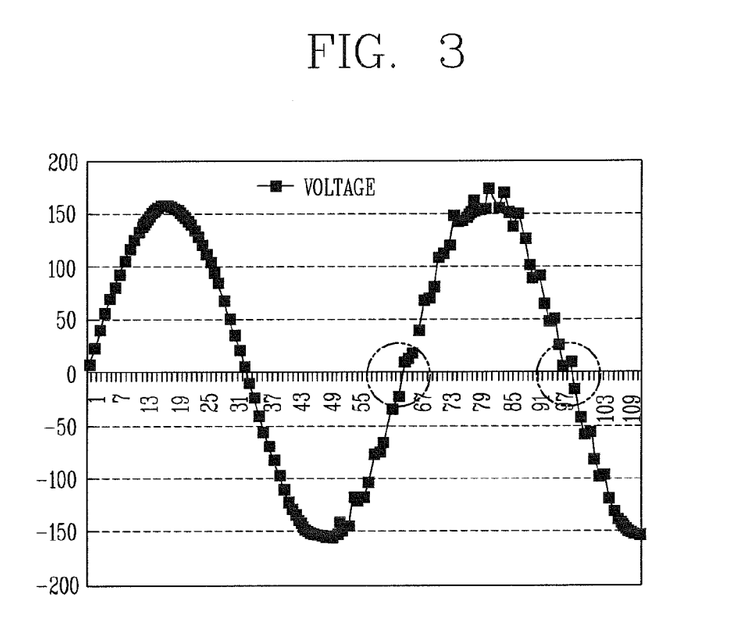
FIG. 3 is a view for explaining a case where an external noise is induced to the input signal.
Figure 4:
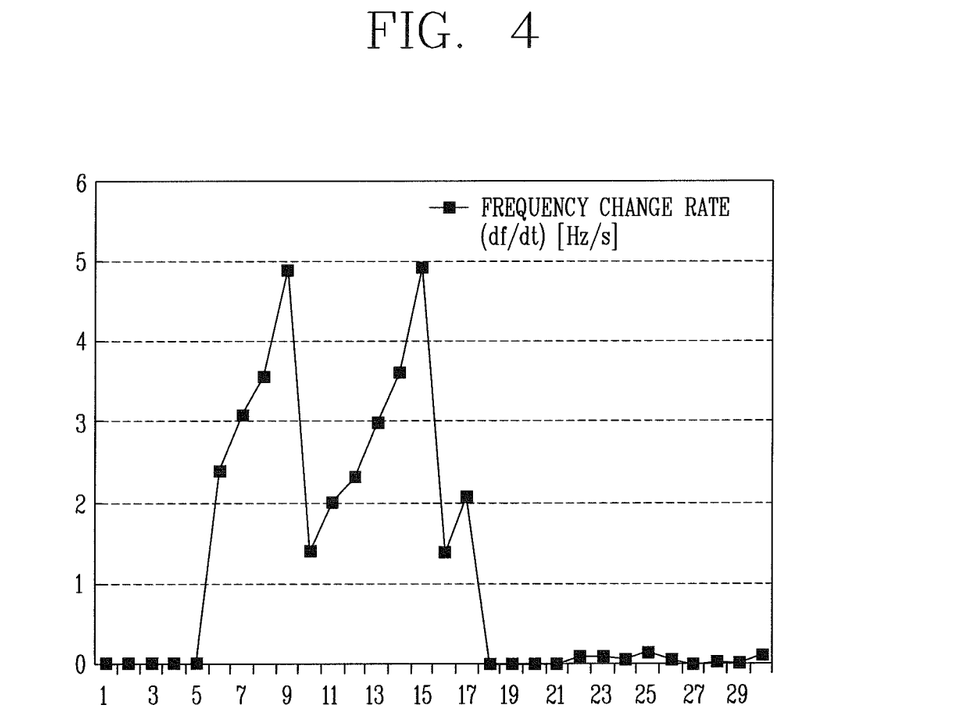
FIG. 4 is a view illustrating a frequency change rate in FIG. 3.

At this time, if an external noise or the like is induced to the input signal, for example, then the frequency change rate value may vary in a different manner from the actual value. FIG. 3 illustrates such an example. As illustrated in the drawing, if an external noise is included in the input signal received at 60 Hz, then a waveform deviated from the zero-crossing position may be drawn (as illustrated in a dotted line circle). Since any zero-crossing time point is not detected at this time, the frequency change rate value calculated from the measured frequency may be changed over a large width. FIG. 4 illustrates a frequency change rate in such a case. In other words, if the calculated frequency change rate has a large data value other than "0" due to the induction of an external noise, and the data value is greater than or equal to a set value stored in the protection relay, then a malfunction of performing a relay operation of the protection relay may occur even when the condition is normal. Accordingly, in a particular case where the frequency change rate is changed over a large width due to the induction of an external noise as described above, it should be determined that the measured voltage waveform is not in a normal input state to prevent a malfunction of the frequency change rate relay element.

Figure 5:
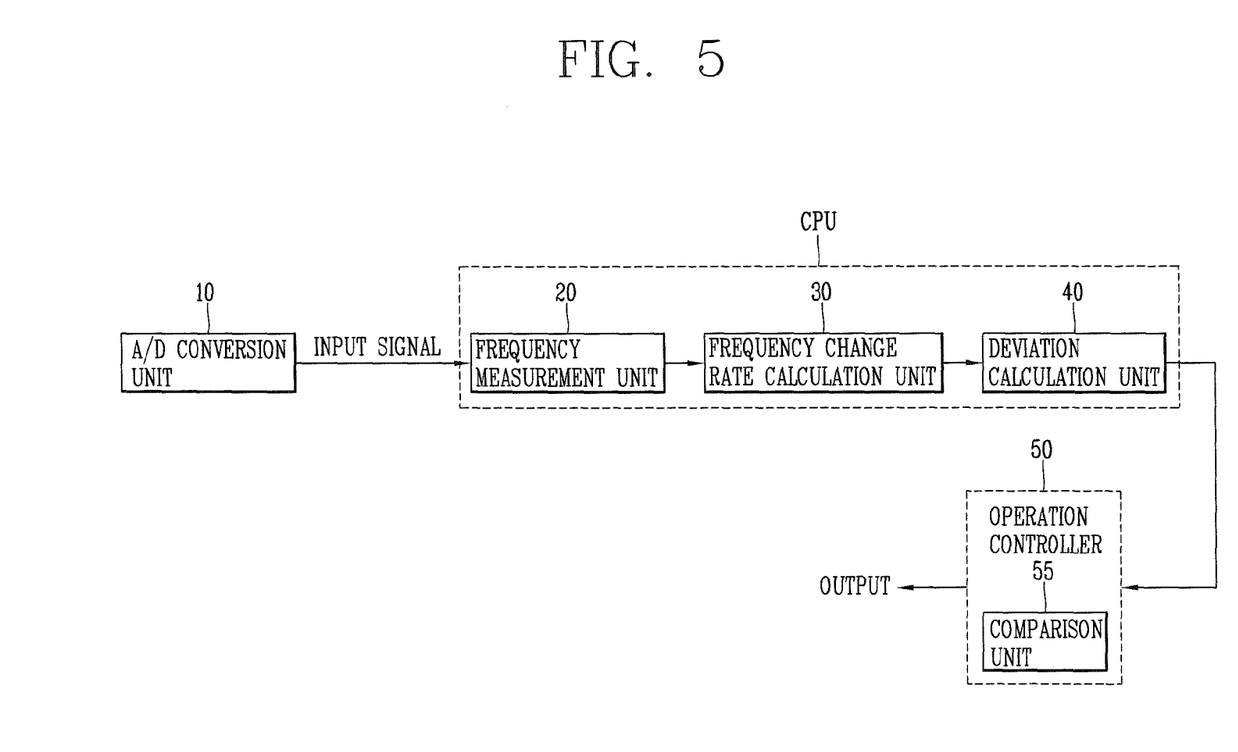
FIG. 5 is a schematic block diagram illustrating a frequency change rate relay element of a digital protection relay according to the present disclosure.

FIG. 5 is a schematic block diagram illustrating a frequency change rate relay element of a digital protection relay according to the present disclosure. The frequency change rate relay element (81R) may include an A/D conversion unit 10, a frequency measurement unit 20, a frequency change rate calculation unit 30, a deviation calculation unit 40, and an operation controller 50.

The A/D conversion unit 10 receives an analog voltage signal input to the power system and converts it into a digital signal and then outputs the converted digital signal to the CPU.

The frequency measurement unit 20 receives an A/D converted voltage signal, namely, input signal, to measure a frequency in a zero-crossing scheme. The zero-crossing scheme may be divided into a first scheme for detecting a time point at which the zero point is crossed from a waveform of the input signal and calculating an interval between the detected zero-crossing time points to measure a frequency, and a second scheme for sampling a waveform of the input signal with a predetermined period and assuming that a waveform between the sampled two points is linear, and then detecting a zero-crossing point using a linear equation. The frequency measurement unit 20 applies f=1/T at a time point at which the zero point is crossed from a waveform of the received input signal to measure a frequency. Here, f denotes a frequency [Hz], and T denotes a period [sec].

The frequency change rate calculation unit 30 calculates a frequency change rate of the frequency for each predetermined period of the measured frequency to acquire first data, and accumulates and averages the frequency for each predetermined period of the measured frequency by a plurality of times and then calculates a frequency change rate of the frequency to acquire one or more second data. Here, for the acquired one or more second data, the accumulated numbers may be applied in a different manner from one another to acquire a plurality of different data values.

In an embodiment, a frequency measured by a half-period discrete Fourier transform may be differentiated $$\left(\frac{df}{dt} = \lim_{\Delta t \to 0} \frac{\Delta f}{\Delta t}\right)$$

with respect to time to acquire the first data. Here, f denotes a frequency, and t denotes a time. Furthermore, a frequency measured by a half-period discrete Fourier transform may be accumulated and averaged by a plurality of times, and then the frequency is differentiated $$\left(\frac{df}{dt} = \lim_{\Delta t \to 0} \frac{\Delta f}{\Delta t}\right)$$

with respect to time to acquire the second data.

Figure 7:
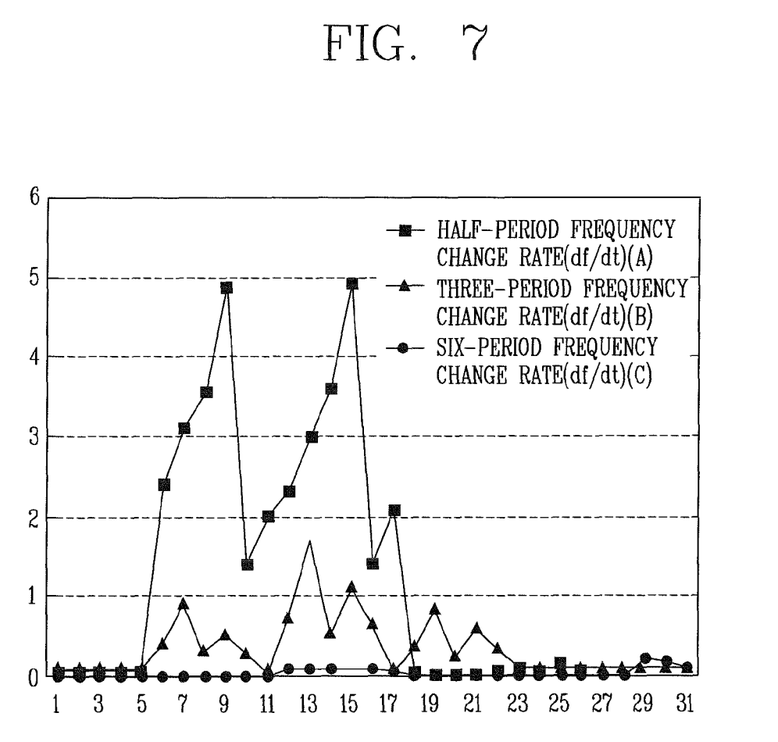
FIG. 7 is a view for explaining each frequency change rate calculated in FIG. 6.

In an embodiment, the first data may be frequency change rate values (A) for which a frequency measured for each half-period is differentiated with respect to time, and second data may be frequency change rate values (B) for which a frequency measured for each half-period is accumulated and averaged six times and the frequency is differentiated with respect to time, and another second data may be frequency change rate values (C) for which a frequency measured for each half-period is accumulated and averaged twelve times and the frequency is differentiated with respect to time. FIG. 7 illustrates a graph for explaining this. In another embodiment, a period of the measured frequency or an accumulated number of the measured frequency applied to the frequency change rate values (A), (B) and (C) may include values other than the above values within a range that the calculation amount and complexity is not rapidly increased. For example, a frequency measured for each one period may be applied to calculate (A), and a frequency measured for each one period may be accumulated and averaged ten times and the average value may be applied to calculate (B), and a frequency measured for each one period may be accumulated and averaged sixteen times and the average value may be applied to calculate (C). Furthermore, in still another embodiment, the one or more second data may include frequency change rate values 4 acquired from the same computation other than (B) and (C).

The deviation calculation unit 40 calculates a deviation of consecutive frequency change rates for a predetermined interval of time from the frequency change rate values calculated by the frequency change rate calculation unit 30.

More specifically, in an embodiment, if it is assumed that first data is frequency change rate values (A) of a frequency measured for each half-period, and second data is frequency change rates (B) of a frequency for which the frequency measured for each half-period is accumulated and averaged six times, and another second data is frequency change rates (C) of a frequency for which the frequency measured for each half-period is accumulated and averaged twelve times, then the deviation may be obtained by calculating a difference between the maximum and minimum values for a current data value and previously consecutive five data values of (B). In another embodiment, the deviation may be calculated by applying the data values of (A) or applying the data values of (B). Furthermore, in still another embodiment, the deviation may be calculated by applying the number of previously consecutive data values which is an object of the difference in a different manner. For example, the deviation may be obtained by calculating a difference between the maximum and minimum values for a current data value and previously consecutive three data values of (A).

The operation controller 50 selects a minimum value of the first data and the one or more second data if a deviation calculated by the deviation calculation unit 40 is equal to or greater than a predetermined reference value, and selects the first data if the deviation is less than the predetermined reference value. Here, the predetermined reference value may be determined through experiment, and an exceptional case is applied to the selection of a minimum value by considering that the frequency change rate value is changed over a large width when a waveform of the provided input signal is abnormal. The selected data may be used as basic data for monitoring a condition of the power system and stably managing the power system.

Furthermore, the operation controller 50 controls whether to perform a relay operation using the selected data. Regarding this, FIG. 7 illustrates each of the calculated frequency change rate. Referring to FIG. 7, for example, a difference between the maximum and minimum values of a current data value and previously consecutive five data values is obtained on the basis of frequency change rate values (B) for three-periods of frequency, and a six-period frequency change rate (C) which is a minimum value is selected if the obtained deviation is equal to or greater than a predetermined reference value, and a half-period frequency change rate (A) is selected similarly to the related art if the obtained deviation is less than the predetermined reference value and used as data for managing the relay operation.

The operation controller 50 may include a comparison unit 55 for comparing the selected data with a set value stored in the digital protection relay. If the selected data value is equal to or greater than the set value based on a comparison result of the comparison unit 55, then the operation controller 50 determines it as a single operation of the distributed power generation to generate a trip signal, thereby operating the frequency change rate relay element (81R). Furthermore, if the selected data value is less than the set value based on a comparison result of the comparison unit 55, then the relay element is not operated, and a series of processes of measuring a frequency from a waveform of the input signal incoming to the frequency measurement unit 20 are repeated again.

Figure 6:
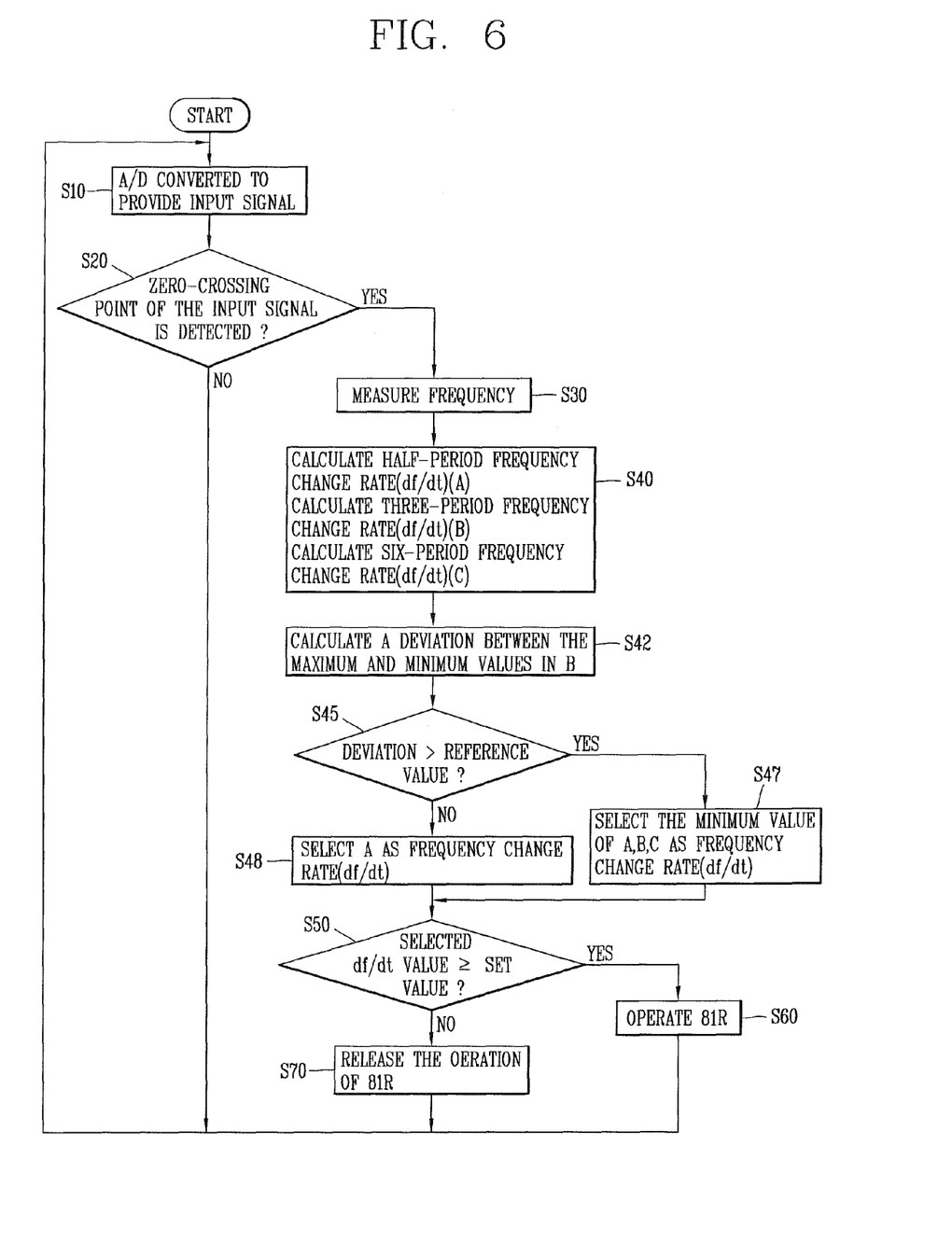
FIG. 6 is an operational flow chart illustrating a frequency change rate relay element of a digital protection relay according to the present disclosure.

FIG. 6 is an operational flow chart illustrating a frequency change rate relay element of a digital protection relay according to the present disclosure. First, if a voltage signal input to the system power is A/D-converted and provided as an input signal (S10), then a time point at which the zero point is crossed is detected for a waveform of the input signal (S20). If any crossing point is not detected in step S20, then the process returns to step S10, and if a time point at which the zero point is crossed is detected, then the process advances to step S30 to measure a frequency from a waveform of the provided input signal.

The frequency change rates of the measured frequency are calculated by a plurality of times to acquire first data and one or more second data (S40). For example, the frequency change rate of a frequency measured for each half-period of the input signal waveform is calculated to acquire first data, and a frequency measured for each half-period of the input signal waveform is accumulated and averaged by a plurality of times and then the frequency change rate of the frequency is calculated to acquire one or more second data. The specific calculation process thereof has been described in detail in the above with reference to FIG. 4.

Then, a deviation of consecutive frequency change rates for a predetermined interval of time is calculated (S42). The deviation may be obtained by calculating a difference between the maximum and minimum values for a current data value and previously consecutive five data values of the first data or the one or more second data.

Then, the calculated deviation is compared with a predetermined reference value (S45). If the deviation is equal to or greater than the predetermined reference value, then a minimum value of the first data and the one or more second data is selected (S47), and if the deviation is less than the predetermined reference value, then the first data is selected (S48).

Then, the relay operation is controlled using the selected data value, and more particularly, the selected data value is compared with a set value stored in the digital protection relay (S50), and as a result of the comparison, if the selected data value is equal to or greater than the set value, then the operation of a frequency change rate relay element is carried out (S60). If the calculated frequency change rate value is less than the stored set value, then the process returns to step S10 to repeat the foregoing steps. In other words, if the selected data value is equal to or greater than the stored set value, then it is determined as a single operation of the distributed power generation to generate a trip signal, thereby performing the operation of a relay element. If the selected data value is less than the stored set value, then the operation of a relay element is not carried out (S70), and returns to step S10 to repeatedly perform the foregoing steps.

A suitable data value (one of the calculated frequency change rate values) may be selected according to a result of comparing a deviation with a predetermined reference value as described above, and thus whether to operate the frequency change rate relay element can be more stably determined, thereby obtaining an effect of preventing a malfunction of the frequency change rate relay element as a result.

According to a digital protection relay and an operation method of the digital protection relay in accordance with the present disclosure, a plurality of different frequency change rates may be calculated from the measured frequency and a frequency change rate value selected based on a predetermined criteria may be used as basic data for controlling the relay operation, thereby obtaining an effect of enhancing reliability for the operation of a frequency change rate relay element.

Furthermore, according to a digital protection relay and an operation method of the digital protection relay in accordance with the present disclosure, it is designed to perform an exceptional condition when a waveform of the input voltage is abnormal while using the operational characteristics of a frequency change rate relay element in the related art requiring a swift operation as it is, thereby obtaining an effect of preventing a malfunction of the frequency change rate relay element in an easy and convenient manner.

As described above, according to a digital protection relay and an operation method of the digital protection relay in accordance with the present disclosure, a plurality of different frequency change rate values may be calculated from a frequency measured from a waveform of the input signal and a frequency change rate value may be selected based on a predetermined criteria and used to control the operation of a relay element, thereby obtaining an effect of enhancing reliability for the operation of a frequency change rate relay element.

What is claimed is:

1. A digital protection relay, comprising:
    a frequency measurement unit configured to measure a frequency of an input signal using a zero-crossing scheme, wherein the frequency is defined by the following equation: $f=1/T$ where f denotes a frequency (Hz) and T denotes a period (sec);
    a frequency change rate calculation unit configured to calculate a frequency change rate of the frequency for each of a plurality of predetermined periods of the input signal to acquire first data, and accumulate and average the measured frequency for the plurality of predetermined periods and then calculate a frequency change rate of the averaged frequency to acquire one or more second data;
    a deviation calculation unit configured to calculate a deviation of consecutive frequency change rates of the first or second data for a predetermined interval of time; and
    an operation controller configured to compare the deviation of the frequency change rates with a reference value, and select either one of the first data and second data based on the comparison result to control the operation of the relay.

2. The digital protection relay of claim 1, wherein the operation controller selects a minimum value of the first data and second data if the deviation of the frequency change rate is equal to or greater than the reference value, and selects the first data if the deviation of the frequency change rate is less than the reference value to control the operation of the relay.

3. The digital protection relay of claim 1, wherein the frequency change rate calculation unit differentiates a frequency measured by a half-period discrete Fourier transform with respect to time to acquire the first data.

4. The digital protection relay of claim 1, wherein the frequency change rate calculation unit accumulates and averages a frequency for each of the plurality of predetermined periods measured by a half-period discrete Fourier transform, and differentiates the average value with respect to time to acquire the second data.

5. The digital protection relay of claim 1, wherein the deviation calculation unit calculates the deviation using maximum and minimum values in a current frequency change rate and a plurality of previously consecutive frequency change rates.

6. The digital protection relay of claim 1, wherein the operation controller comprises a comparison unit for comparing the selected first data or second data with a prestored set value.

7. The digital protection relay of claim 6, wherein the operation controller determines a single operation of the distributed power generation to generate a trip signal if the selected data is equal to or greater than the prestored set value based on a comparison result of the comparison unit.

8. The digital protection relay of claim 1, further comprising:
    an analog-to-digital (A/D) conversion unit configured to convert system power into a voltage signal and A/D-convert the voltage signal to output the input signal.

9. An operation method of a digital protection relay, the method comprising:
    measuring a frequency of an input signal using a zero-crossing scheme, wherein the frequency is defined by the following equation: $f=1/T$ where f denotes a frequency (Hz) and T denotes a period (sec);
    calculating a frequency change rate of the frequency for each of a plurality of predetermined periods of the input signal to acquire first data;
    accumulating and averaging the measured frequency for the plurality of predetermined periods and then calculating a frequency change rate of the averaged frequency to acquire one or more second data;

calculating a deviation of consecutive frequency change rates of the first or second data for a predetermined interval of time;

selecting either one of the first data and second data based on a result of comparing the deviation of the frequency change rates with a reference value; and controlling the operation of the relay using the selected first data or second data.

10. The method of claim 9, wherein said selecting step selects a minimum value of the first data and second data if the deviation of the frequency change rate is equal to or greater than the reference value, and selects the first data if the deviation of the frequency change rate is less than the reference value.

11. The method of claim 9, wherein said acquiring first data differentiates a frequency measured by a half-period discrete Fourier transform with respect to time to acquire the first data.

12. The method of claim 9, wherein said acquiring second data accumulates and averages a frequency for each of the plurality of predetermined periods measured by a half-period discrete Fourier transform, and differentiates the average value with respect to time to acquire the second data.

13. The method of claim 9, wherein said calculating the deviation calculates the deviation using maximum and minimum values in a current frequency change rate and a plurality of previously consecutive frequency change rates.

14. The method of claim 9, wherein said controlling the operation of the relay controls the operation of the relay based on a result of comparing the selected first data or second data with a prestored set value.

15. The method of claim 14, wherein said controlling the operation of the relay determines a single operation of the distributed power generation to generate a trip signal if the selected first data or second data is equal to or greater than the prestored set value based on the comparison result.

16. The method of claim 14, wherein said controlling step returns to measuring the frequency of the input signal if the selected first data or second data is less than the prestored set value based on the comparison result.

* * * * *